United States Patent
Pick, deceased

[11] Patent Number: 5,137,285
[45] Date of Patent: Aug. 11, 1992

[54] SEALING SYSTEM FOR MUTUALLY ROTATING MACHINE PARTS

[75] Inventor: Claus-Uwe Pick, deceased, late of Friedrichshafen, Fed. Rep. of Germany, by Marina Pick, legal representative

[73] Assignee: Zahnradfabrik Friedrichshafen AG, Fed. Rep. of Germany

[21] Appl. No.: 670,494

[22] Filed: Mar. 15, 1991

Related U.S. Application Data

[63] Continuation of Ser. No. 275,084, Sep. 23, 1988, abandoned.

[30] Foreign Application Priority Data

Mar. 24, 1986 [WO] PCT Int'l Appl. ... PCT/EP86/00178
Jun. 19, 1986 [WO] PCT Int'l Appl. ... PCT/EP86/00363
Mar. 11, 1987 [WO] PCT Int'l Appl. ... PCT/EP87/00143

[51] Int. Cl.$^5$ .............................. F16J 15/32
[52] U.S. Cl. .................... 277/47; 271/25; 271/58; 271/153
[58] Field of Search .............. 384/482, 489, 485, 486; 277/152, 153, 179, 47, 35, 58, 214, 215

[56] References Cited

U.S. PATENT DOCUMENTS

| | | | |
|---|---|---|---|
| 2,181,203 | 11/1939 | Reynolds | 277/179 |
| 2,188,855 | 1/1940 | Chievitz | 277/205 |
| 2,202,944 | 6/1940 | Boyd | 277/58 |
| 2,743,951 | 5/1956 | Ayres et al. | 277/47 |
| 2,851,315 | 9/1958 | Zavoda | 277/49 |
| 3,511,512 | 5/1970 | Wheelock | 277/47 |
| 3,980,309 | 9/1976 | Dechavanne . | |
| 4,017,089 | 4/1977 | Kurata et al. | 277/152 |
| 4,274,641 | 6/1981 | Cather, Jr. | 277/153 |
| 4,449,717 | 5/1984 | Kitawaki et al. | 277/152 |
| 4,553,763 | 11/1985 | Ehrmann . | |
| 4,611,931 | 9/1986 | Brandenstein et al. | 384/484 |
| 4,905,135 | 9/1989 | Ries | 277/152 |

FOREIGN PATENT DOCUMENTS

011977DEX
| | | |
|---|---|---|
| 0104504 | 2/1983 | European Pat. Off. . |
| 0120987 | 5/1986 | European Pat. Off. . |
| 711737 | 10/1941 | Fed. Rep. of Germany ...... 277/153 |
| 949916 | 7/1949 | Fed. Rep. of Germany ...... 277/153 |
| 1939597 | 2/1970 | Fed. Rep. of Germany ...... 384/484 |
| 2530097 | 1/1975 | Fed. Rep. of Germany . |
| 3225906 | 4/1984 | Fed. Rep. of Germany . |
| 78715 | 9/1950 | Netherlands ...................... 277/153 |
| 562456 | 7/1944 | United Kingdom ............... 277/153 |
| 764231 | 12/1956 | United Kingdom ............... 277/153 |

OTHER PUBLICATIONS

Simrit-Metalastik Merkbuch 1960.

*Primary Examiner*—William A. Cuchlinski, Jr.
*Assistant Examiner*—Daniel G. DePumpo
*Attorney, Agent, or Firm*—Davis, Bujold & Streck

[57] ABSTRACT

The sealing system consists of a commercially-available shaft seal (2), having a covering ring (3) to protect the shaft seal dirt and from exposure to the atmosphere. The covering ring (3) pre-arranged separately outside the conventional flexible shaft seal (2) and is made of a material which is specially suited for drying running, having high strength values and low internal damping, and is designed with a Z or S-shaped intermediate wall (6) which has a radially elastic action. The seal gap (8) is covered, on the side exposed to contamination, first by a scraper lip (12) having radial preloading, and then by a cylindrical jacket region (10) of a guide ring (16) so that the lip (12) can follow the eccentric movements of the rotating machine part (1). The guide ring (16), which is fitted axially in relation to the scraper lip (12), is designed with a cylindrical jacket region (10) that surrounds the rotating machine part (1) as closely as possible and thus entrains the scraper lip (12) without any significantly increased distortion or radial deflections even in the event of eccentric or oscillating movements. The radial elasticity of the seal ring during oscillating movements, is ensured by using appropriate design expedients, such as axial notches (13, 14), or a thin intermediate wall (6) between the inner guide ring (16) and outer support ring (7), which is held firm against rotation and axial movement, and by the S or Z-shaped cross-section.

10 Claims, 2 Drawing Sheets

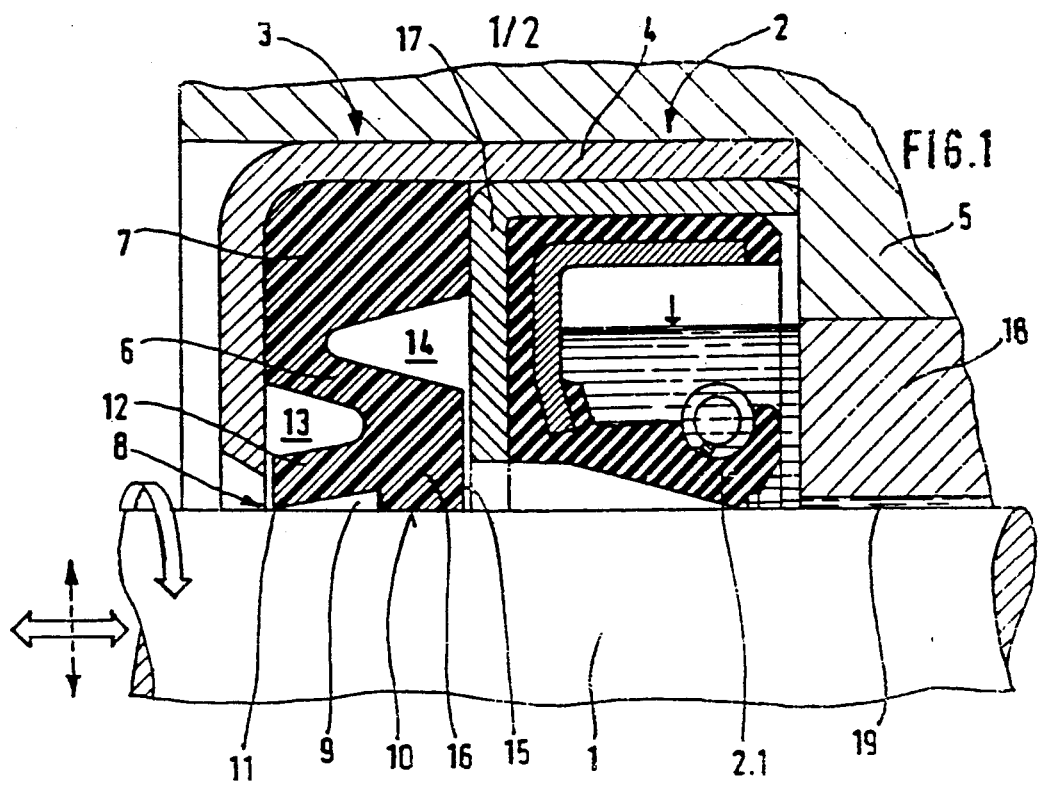
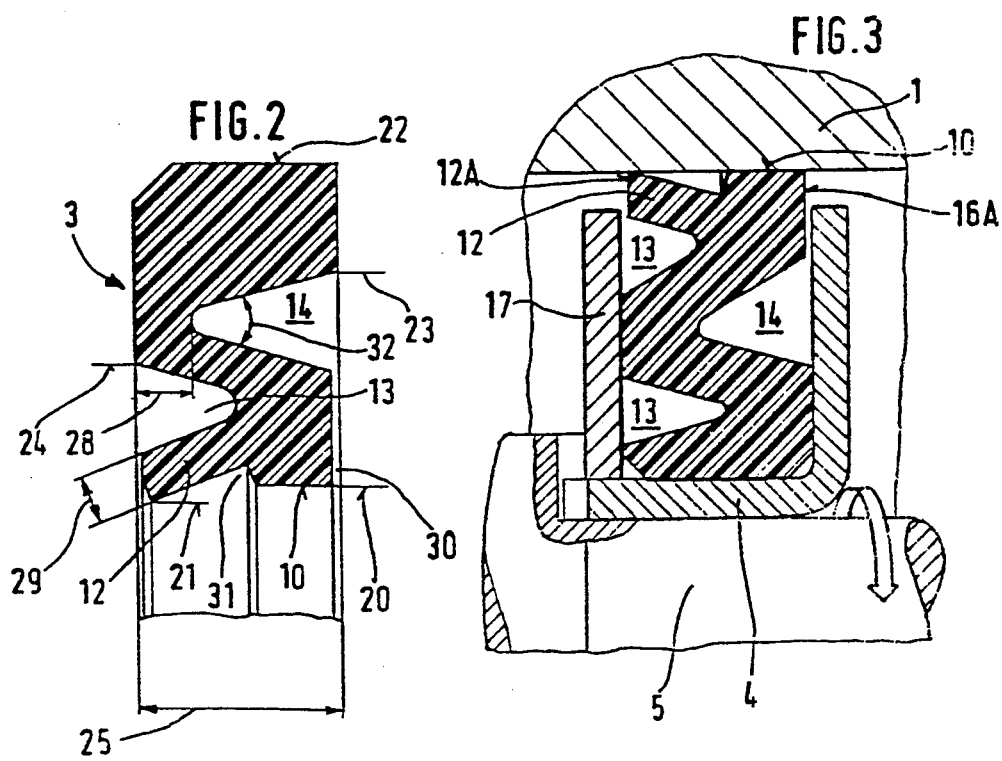

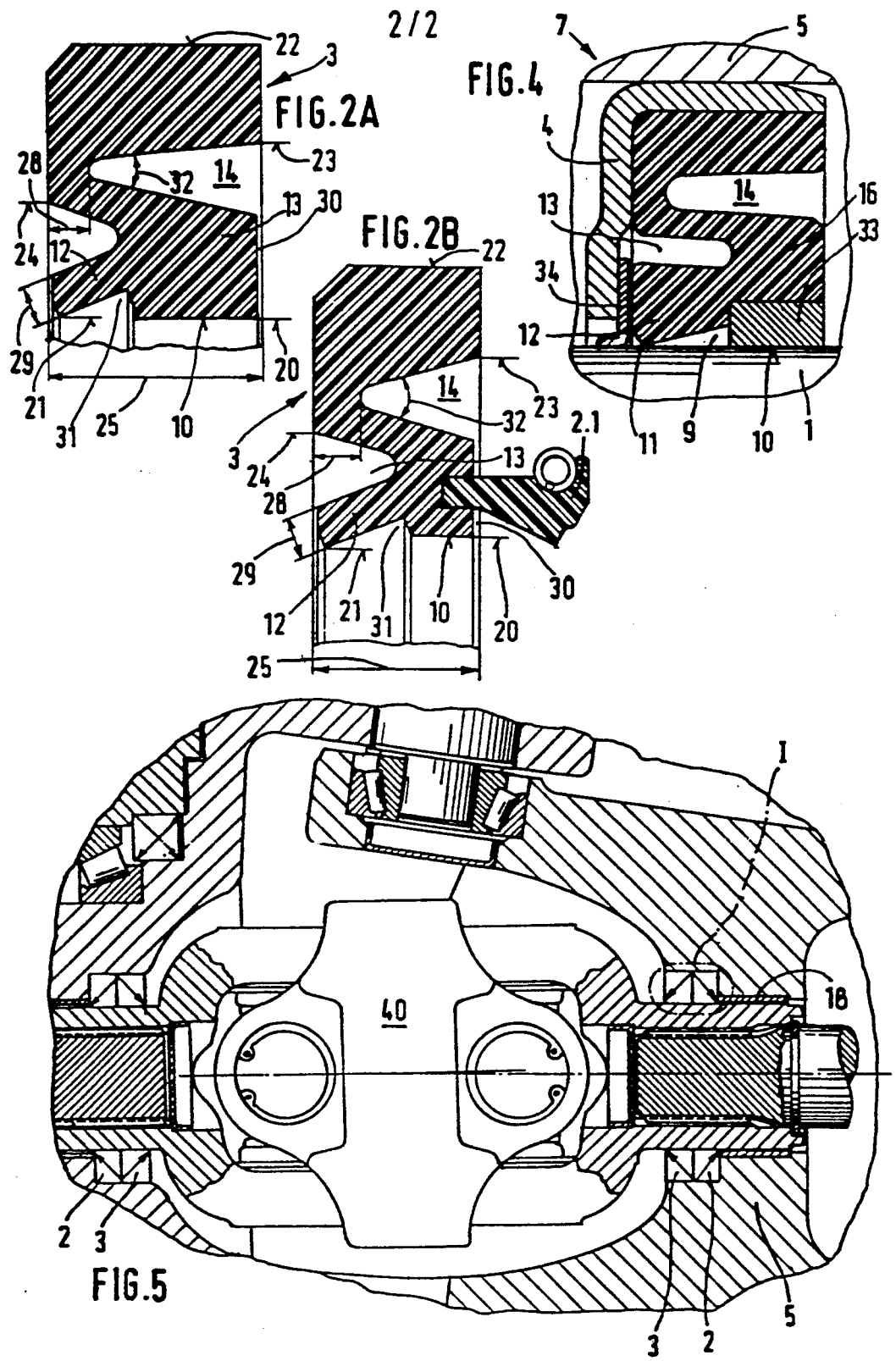

SEALING SYSTEM FOR MUTUALLY ROTATING MACHINE PARTS

This is a continuation of copending application Ser. No. 07/275,084 filed on Sep. 23, 1988 now abandoned.

The invention concerns a sealing ring to be situated between mutually axially moveable and rotating machine parts which, in addition, can be eccentrically moved.

The invention is especially useful for cases in which the machine parts must mutually perform radial and also larger axial and pivotal movements under the strong external action of dirt (due to dust, slime, humidity, etc.) and yet must achieve an oil tight seal on the internal side. This is the case, for instance, in the seals of differential shafts needed between the yokes and the axle housing when the steering axles of field tractors, construction vehicles, etc., are driven and as a consequence of the swivel geometry of the steering pivot bearing, depending on the direction and size of the steering angle, the differential shaft is, to a more or less extent, axially moved and at the same time is more sideways inclined, as is usual in normal cases of use of shaft seals. Since in those cases where a reduction of speed mostly takes place only in the wheel head drive and the speeds of the differential shafts can still be relatively high, even in agricultural and construction machines, an accelerated penetration of solids in the seal gap occurs especially easily. As result of the accompanying deposit of solids in the shaft seal rings flexibly designed mostly of a rubber base, the consequence is a premature breakdown of the oil film that supports the radial force of the lip of the shaft seal. The serviceable life of the seal is rapidly shortened due to the friction of mixed and solid bodies that promote wear and tear, and the expenses due to machine breakdown and numerous repair work are considerable.

The solution is obtained by the fact that a covering ring, shaped as a scraper and made of a tough material of low abrasion, has a guide ring both radially cushioned and axially fixed by which a cylindrical scraper lip, integrally formed therewith, is continuously compelled to closely follow the radial deflections of the rotating machine part (shaft or wheel), since the guide ring and the lip are moved together in the same direction and at the same frequency for a substantial part of the stroke of the eccentricity. Since the free angle between the seal countersurface and the lip can remain almost unchanged by virtue of the rotational synchronous radial deflections, even in the presence of maximum eccentricity, a material having low internal damping, a low tendency to absorb solids and also a low readiness to wear can be used. The adaptation movements still to be carried out eventually by the scraper lip proper can now be tolerated with a sufficiently long serveability, even with eccentricities many times greater than are admissible in the conventional rubber shaft seals, by virtue of a reduction of the necessary degree of distortion, determined by the construction, while using a homogeneous sealing material with reduced capacity for dirt absorption, better scraping action and a higher resistance to wear. A material that is considered for this design, for instance, is polyurethane which has hitherto been chiefly used as a seal for a dirt covering of ball bearings or as a scraper in piston rods where no great eccentricities occur. With the radially cushioned arrangement or structure of the guide ring and with the narrow bearing play thereof, in relation to the rotating machine part, its relatively rigid body portion now assumes also the continuous new centering of the scraper lip with a correspondingly low distortion and without a circular gap opening as a consequence of becoming oval. The guide ring is at the same time a good centering counter support for the scraping forces against superimposed piston-like axial movements as result of the axial rigidity of the rotating machine part. In fatigue tests, the adequacy of this construction has been demonstrated with elastomers whose tensile strength amounts to more than 30 N/nm$^2$. Therefore, according to the invention, the elasticity required for the radial cushioning of the rigid guide ring is obtained not primarily with the properties of the guide ring material that carries the scraper lip but predominantly with a special molding or axial and radial support in the housing, the guide ring being to a certain degree used also as a control element for the radial movements of the protective lip.

This seal ring preforms, if necessary, a double function as a scraper and as a rotating shaft seal having relative moving and pivoting movements with the provisions for considerable radial deflections, fulfills the instant requirements of long serviceability and sealing action with a short over-all length and a simple total construction. An especially shear-resistant design of the scraper lip prevents migration of the dirt adhering to the shaft even during reciprocating movements.

The stripping effectiveness of the sealing edges of the covering ring are favorably influenced by means of axial reinforcement of the scraper lip obtained by the particular lip configuration, the insert parts, or the materials used.

With an axial air gap before a frontal surface of the covering ring, adjacent the rotating machine part and facing the shaft seal opposite an axial supporting surface, denting distortions appearing upon axial thrust against the covering ring, without the lip being lifted from the seal gap, can be favorably absorbed. The guide ring leads the lip concentrically, since its cylindrical jacket region works as radially resilient friction bearing.

In particular, polyurethane, polyester, or polytetrafluoroethylene can be considered as advantageous materials having favorable scraping properties compared to different kinds of rubber. A favorable possibility for control of the slowness to adaptation according to material can consist in selecting the width of the cylindrical jacket region of the guide ring in a manner such that even with elevated eccentricities the friction of this part acting as friction bearing remains still slight and thus also the wear thereof. At the same time, the sealing edge of the scraper lip is not inadmissibly pressed vigorously against the sealing surface and does not wear much quicker than in the case of concentric rotation.

A structional combination of the covering ring with the inserted shaft seal proper in a common housing jacket can contribute advantages in assembly. There is offered the possibility of providing an axial supporting surface in the form of an intermediate wall of said housing jacket. Vertically offset axial notches on opposite surfaces of the body part create a Z- or S-shaped connecting wall representing an especially simple design step to obtain the required radial elasticity in the axially rigid covering ring or tough material.

In an adequate axially rigid construction of the shaft seal inserted on the seal side, a direct integration thereof with the covering ring such as by gluing can also be advantageous. Furthermore, it would be conceivable to attach a flexible oil lip to the guide ring only on the oil side and center this, for instance, by insertion in a ring groove on the guide ring. Another manner of providing the favorable radial elasticity behavior for the covering ring, without the need of additional material such as for a jacket, can consist of providing on both peripheries of the covering ring obviously equal radial notches and for each two jacket regions that spread under radial prestress, wherein the support ring having the stationary machine part is kept by clamping non-torsional on said stationary machine part.

In case the material chosen for the guide ring itself does not have sufficiently low friction-bearing properties, an insert of an especially low friction-bearing material such as polytetrafluoroethylene can also be provided, at least in the cylindrical jacket region. The use of so-called oil-return grooves, such as known per se, can also be provided in said cylindrical jacket region.

The advantages of the invention, in principle, can be attained with a covering ring non-torsionally retained both on the external periphery and on the internal periphery. In the latter mentioned variant, centrifugal force can help to throw dust back from the seal gap.

By coating the covering ring with a sheeting, at least on the dirt side, the accumulation of dirt is, on the one hand, further prevented and, on the other, the axial rigidity is further improved without, at the same time, impairing the possibility of thorough radial cushioning. An intermediate wall of the housing jacket between the covering ring and the shaft seal can be provided for axial support. With a radially back springing sheet protecting the externally situated axial notch, the accumulated dirt on that side of the sealing edge can be continuously scraped off by a resilient "peeling knife" while protecting the sealing edge of the scraper lip until said sealing edge of the lip becomes coated against dirt accumulations.

In particular, the invention is adequate for use in steering and differential shafts of driven steering axles of construction vehicles and tractors, since there also exists the danger of mechanical damage of the scraper lip due to stones, etc., which are clearly reduced according to the invention by a covering ring of a high-strength elastomer that is radially deflectable and situated before the conventional shaft seal ring.

The invention is not confined to the combinations disclosed herein and other logical possible combinations will result to experts according to the stated problem herein.

Other advantages of the invention can be seen from the drawings explained in detail with reference to the embodiments.

FIG. 1 shows the covering ring in a common housing jacket assembled with a commercially available radial shaft ring which it protects from the penetration of dirt from a radially and axially oscillating shaft;

FIG. 2 shows measurement ratios of a covering ring according to the invention, that have proven successful in tests with the relative ratios calculated on the basis of the shaft diameter FIG. 2A shows another embodiment of FIG. 2;
FIG. 2B shows a further embodiment of FIG. 2;
FIG. 3 shows the covering ring attached to the rotating machine part on its inner periphery so as to be pressed in its seal gap by centrifugal force, and the dirt retained before the scraper lip is easily centrifuged outwardly;

FIG. 4 shows a covering ring having a low friction-bearing material in the cylindrical jacket region of the guide ring and, before the scraper lip, an additional covering of spring ring acting as "peeling knife"; and FIG. 5 is an embodiment for a sealing system according to the invention on a driven steering axle for land vehicles between the steering pilot bearing and the differential or wheel transmission.

In FIG. 1, a conventional shaft seal 2 for oil sealing and, as protection against dust, a scraper shaped as covering ring 3 are provided on a rotating machine part 1 such as a shaft which both rotates and undergoes considerable radial and axial deflections. They are combined in a common housing jacket 4 and coaxially disposed successively in a stationary machine part 5, such as an axle pipe, and non-torsionally retained there, for instance, with the aid of a sealing glue. Both the common housing jacket 4 and the shaft seal 2 are axially supported by an annular shoulder of the stationary machine part 5 against the shearing forces originating from the rotating machine part 1. While the shaft seal 2 consists of relatively flexible, rubber-like sealing material and, at least when new, offers a satisfactory seal against the lubricant oil cropping out before its seal lip on the side opposite the covering ring 3, even during considerable eccentric rotation of the rotating machine part 1 resulting from sufficient lubricant, it must assume within the shortest possible length, on the opposite side of the covering ring 3, mainly scraping functions under predominantly dry friction against the penetration of dirt during axial movement of the rotating machine part in the proximity of the shaft seal 2. The covering ring 3 essentially consists of an inner body to be regarded as a guide ring 16 having a cylindrical jacket region 10 and being axially rigidly connected with an integral scraper lip 12, separated therefrom on the side exposed to dirt, by a radial and an axial ring notch 9 and radially flexibly connected, via an intermediate wall 6 provided with axial notches 13, 14, with a support ring 7 that likewise envelops it externally in a manner such as to result in an approximately Z or S-shaped cross section. In the seal gap 8, between the rotating machine part 1 and the covering ring 3, two jacket regions are provided which are separated by the wedge-like radial notch 9. A scraper lip 12, having a frustoconical sealing edge 11 inclined toward the axis of rotation and forming an angle 31 and running out ahead with its front surface perpendicular to the axis of rotation, is situated before the cylindrical guide ring 16. When inserted, the sealing lip 12 presses itself under radial prestress against the rotating machine part 1, even under considerable eccentricity of the axis of rotation in relation to the bearing axle, in a manner such that its angle 31 is retained. During the eccentric rotation of the cylindrical jacket region 10 of the inner part of the covering ring 3 that serves as the guide ring 16, the side facing the shaft seal 2 has to carry the main load. A narrow clearance fit is provided so that, according to the eccentricities of the rotating machine part 1, the guide ring 16 and the scraper lip 12 also swing up and down with said cylindrical jacket area. The scraper lip forms a second jacket region directly integral with it on the dirt side remote from the shaft seal 2 and, as consequence of the entrainment by the support ring 7, moves along almost at the same height and frequency in relation to the rotating machine part 1 or 5. By virtue of a wedge-like configuration of the dirt side edge of the scraper lip, the former abuts as a jacket region shaped as sealing edge 11 with a considerably narrower surface compared to the cylindrical jacket region 10 but, while avoiding to the greatest extent eccentric loads, it is pressed with almost constant prestressing closely against the rotating machine part 1 even during the stroke or swinging movements. Because of dry friction and dirt accumulation, no materials having high inner damping, such as rubber, are usable and stiffened rings are needed. The required inner elasticity of the scraper ring 3 for achieving the radial prestress is primarily obtained by a special design.

In this embodiment, axial notches 13, 14 that open in the form of a V and have a depth exceeding half the width of the covering ring 3 are provided for this purpose on each of its two sides in an arrangement vertically offset in relation to the axial notch 13 or 14 by approximately the radial height thereof. Thus, the intermediate wall 6 acquires approximately an S or Z-shaped cross section. The groove bottom of the axial notches 13, 14 is well rounded and a relatively larger angular aperture is provided to make the caking of dirt difficult. An axial air gap 15 that extends to the upper axial notch 14 is present between the shaft seal 2 and the front side of the covering ring 3 that faces it and in which the radially swinging guide ring 16 of the covering ring 3 can axially flatten during the cushioning operation, and during axial thrust against the scraper lip 12, after a short axial course as axial support 17, can lean against the rear wall of the shaft seal 2 that serves as a radial intermediate wall of the housing jacket 4. Although the scraper lip 12, which is preferably made of a very wear-resistant elastomer of low inner dampening or poor springing behavior, is always cushioned in the direction of the rotating machine part 1, the lip 12 would be unable to follow alone a great eccentricity of the rotating machine part quickly enough, without the guide ring 16, so that there always exist a minimal seal gap 8. But since the guide ring 16 assumes a forced guidance of the lip 12, according to the invention, synchronously with the radial deflections of the rotating machine part 1, the lip 12, despite the tough anti-wear properties of the material used, still can perform its sealing task satisfactorily during a much longer period of use. The low capacity for absorption of solids can be further enhanced by an extensive axial sheeting 4 on the dirt side which can be extended over the outer axial notch 13.

The radial deflections of the guide ring 16, due to frequent long-stroke relative movements, can be superposed in an axial direction. These deflections can be more considerable than the bearing play of the rotating machine part 1 in relation to a bearing 18 added to the shaft seal 2 since, in case of great lateral forces, a misalignment of the rotating machine part 1 in the guidance of the bearing 18 can take place as is the case, for instance, in universal-joint differential shafts of driven steering axles. The air gap 19 of the bearing 18 can be considerably larger than the bearing play present in the cylindrical jacket region 10 of the guide ring 16.

In FIG. 2 the measurements of the covering ring 3 are given and they have been determined from the diameter of the rotating machine part 1 and have proved good in the range of about 30 to 100 mm diameter.

On the side facing the oil in FIG. 2B, indicated as an alternative, is an oil lip 2.1 of elastic material whose wedge-shaped pointed sealing edge presses perpendicularly against the rotating machine part 1, 5 while it can be radially fastened such as by clamping in an axial ring groove of the covering ring 3.

In FIG. 3, the covering ring 3 is shown as an embodiment in which it is retained by the rotating machine part 1 and, from the inside, is compressed by centrifugal force toward a larger diameter, and although the seal gap has been made somewhat larger, it is utilizable for self-cleaning effects. In such cases, the preferred dimensional ratios of the sealing cross section apply in an inversed sense. To compensate for the elevated radial rigidity of the jacket region 10 resulting from the larger periphery, a larger number of axial notches 13, 14 provided uniformly offset in respect to each other can be chosen. Thus, in the instant case, the axial notch 13 is present twice on the dirt side. FIG. 3 also shows that in case of adequate axial support 17 of the covering ring 3, with the shaft seal 2, the wall needs not be directly assembled.

In FIG. 4, the principle of the invention is complemented by a special friction bearing 33 in the cylindrical jacket region 10, below the guide ring 16, whereby the friction between said ring and the rotating machine part 1 can be maintained especially small. By a special surface design of the bearing surfaces of the cylindrical jacket region 10, it is optionally possible to obtain an additional oil seal by means of oil-return grooves or the like in a manner known per se. A radially deflectable, eventually slotted spring ring disk 34, having an oil section whose base abuts against the surface of the rotating machine part 1, protects the axial notch 13 against dirt, on the dirt side, and reduces the danger of damage to the scraper lip 12.

In FIG. 5, the rotating machine part 1 is a yoke sleeve non-torsionally but axially movably guided by a differential shaft, and led via a bearing into an axle housing with a sufficiently large radial air gap in order to allow, during the steering operations, the eccentric movements caused by the oscillating geometry of the associated double universal joint 40. The yoke sleeve makes, along with the main rotation movements, simultaneous axial and radial bearing changes which the seal system 2 and 3, pre-arranged with protection outside the bearing in an annular gap, must resist as long as possible with sufficient oil sealing even, under the action of strong contamination and often extreme atmospheric influences. This is especially attained with the system according to the invention since, in comparison with conventional shaft seals running dry, a much less sensitive material can be used for that purpose and, due to its construction, it has favorable design features both for the scraping and for the guiding function in the radial direction. The shaft seal 2 situated structurally and functionally separate from the covering ring 3 can be durably protected against the dirt loads by a construction known per se, and thus be made of considerably more flexible material which is free from dirt and atmospheric influences, can now also considerably better withstand stronger eccentricities and axial movements with long-term reliable oil sealing action.

Reference numerals 1. rotating machine part (shaft or wheel)
2. shaft seal
3. covering ring
4. housing jacket (for 2 and 3)
5. stationary machine part (axle pipe or axle)
6. intermediate wall
7. support ring
8. seal gap (between 2 and 3)
9. radial notch (below 12)

10. cylindrical jacket region
11. sealing edge (of 3)
12. scraper lip (on 16)
13. axial notch (on dirt side)
14. axial notch (before shaft seal 2)
15. axial air gap
16. guide ring (of 3)
17. axial support (of 2)
18. friction bearing
19. air gap
20. nominal diameter of 10
21. nominal diameter of 11
22. outer diameter of 7
23. outer diameter of 14
24. outer diameter of 13
25. total width of 7
26. width of 10
27. depth of 13 or 14
28. thickness of 6
29. thickness of 12
30. axial rebound of 16
31. skew angle of 12
32. angular aperture of 13/14
33. friction bearing
34. spring ring disk
35. flexible envelopment
36. peripheral reinforcement
37. clamping collar
38. radial groove
39. supporting lip
40. double universal joint

I claim:

1. A seal ring to be situated between two mutually axially movable and rotating machine parts (1, 5) which can be mutually eccentrically displaced for preventing a contaminant located on one side of said seal ring from passing by said seal ring, during movement of the two machine parts, to an opposed oil side of said seal ring, comprising:

a scraper lip (12) being slidably engagable with one of the machine parts (1, 5) and integrally formed with a guide ring (16), concentrically guided in relation to that one machine part, and a support ring (7), secured to the other machine part (5, 1), being connected with said guide ring (16) and said scraper lip (12) via a radially yieldable intermediate wall (6), characterized in that said seal ring has a generally z-shaped cross section and said guide ring has an elongate cylindrical surface for engaging said one machine part (1 or 5), in use, and guiding said scraper lip with respect to said one machine part (1 or 5), said scraper lip (12) is axially stiff and forms a sealing edge (11) with a surface (12A), facing the contaminant side, said surface extends substantially perpendicularly to said one machine part, and said scraper lip (12) has a radial notch (9) of wedge-shaped cross section between said sealing edge (11) and said guide ring (16), said scraper lip (12), when assembled, abuts against said one machine part (1 or 5) and is movable relative to and forms an acute angle (31) with said one machine part, and an axial air gap (15) is provided opposite an axial supporting surface (17) adjacent and opposite to an axially facing side (16A) of said guide ring (16), said axially facing side is out of contact with said supporting surface during a predominant radial stress of said guide ring (16), but abuts against said supporting surface (17) upon additional axial thrust against said scraper lip (12).

2. A seal ring (3) according to claim 1, characterized in that a common housing jacket (4) surrounds said seal ring (3) and a shaft seal (2) positioned adjacent said seal ring (3) on the oil side.

3. A seal ring (3) according to claim 1, characterized in that said z-shape cross-section is formed by at least two mutually vertically offset V-shaped axial notches (13, 14) with rounded grooved bottoms in the intermediate wall, said V-shaped axial notches (13, 14) start from the contaminant and oil facing surfaces (24 and 16A) of said seal ring and extended beyond the center of the seal ring (3).

4. A seal ring (3) according to claim 1, characterized in that said seal ring further includes a friction bearing (18) which is provided radially between a cylindrical region (10) of said guide ring and said rotating machine part (1).

5. A seal ring (3) according to claim 1, characterized in that said seal ring (3) is fixedly attached relative to said stationary machine part (5) that surrounds said seal ring.

6. A seal ring according to claim 1, wherein said scraper lip (12) has a sealing edge (11) which closely engages said one machine part, said sealing edge having a width substantially smaller than the width of said elongate cylindrical surface.

7. A seal ring (3) to be situated between two mutually axially movable and rotating machine parts (1, 5) which can be mutually eccentrically displaced, for preventing contaminants located on one side of said seal ring from passing by said seal ring, during movement of the two machine parts, to an opposed oil side of said seal ring, comprising:

a scraper lip (12) being slidably engagable with one of the machine parts (1, 5) and integrally formed with a guide ring (16), concentrically guided in relation to that one machine part, and a support ring (7), secured to the other machine part (5, 1), being connected with said guide ring (16) and said scraper lip (12) via a radially yieldable intermediate wall (6), characterized in that said seal ring has a substantially z-shaped cross section and said guide ring has an elongate cylindrical surface for engaging said one machine part (1 or 5), in use, and guiding said scraper lip (12) with respect to said one machine part (1 or 5), said scraper lip (12) is axially stiff and forms a sealing edge (11) with a surface (12A), facing the contaminant side, said surface extends substantially perpendicularly to said one machine part, and said scraper lip (12) has a radial notch (9) of wedge-shaped cross section between said sealing edge (11) and said guide ring (16), said scraper lip (12), when assembled, abuts against said one machine part (1 or 5) and is movable relative to and forms an acute angle (31) with said one machine part, said seal ring comprising an elastomeric material having a tensile strength of more than 25 N/mm$^2$, an abrasion of less than 50 m$^3$ and a Shore-A hardness of more than 50, and said seal ring further includes a resilient shaft seal (2), for sealing said one machine part (1 or 5), located adjacent the seal ring (3) on the oil side.

8. A seal ring (3) according to claim 7, characterized in that said elongate cylindrical surface has an axial length equal to or larger than an axial length of said scraper lip (12).

9. A seal ring to be situated between two mutually axially movable and rotating machine parts (1, 5) which can be mutually eccentrically displaced for preventing a contaminant located on one side of said seal ring from passing by said seal ring, during movement of the two machine parts, to an opposed oil side of said seal ring, comprising:

a scraper lip (12) being slidably engagable with one of the machine parts (1, 5) and integrally formed with a guide ring (16) that is concentrically guided in relation to that one machine part, and a support ring (7), secured to the other machine part (5, 1), being connected with said guide ring (16) and said scraper lip (12) via a radially yieldable intermediate wall (6), characterized in that said seal ring (3) has a generally z-shaped cross section and said guide ring has an elongate cylindrical surface for engaging said one machine part (1 or 5), in use, and guiding said scraper lip with respect to said one machine part (1 or 5), said seal ring is made of an elastomeric material having a tensile strength of more than 25 N/mm$^2$, an abrasion of less than 50 m$^3$ and a Shore-A hardness of more than 50, when said seal ring is assembled, said guide ring (16) faces the oil side of the seal and said scraper lip (12) extends substantially axially from said guide ring toward the contaminant side of the seal, said scraper lip (12) is axially stiff and forms a sealing edge (11) with a surface (12A), facing the contaminant side, said surface extends substantially perpendicularly to said one machine part, a radial notch (9) of wedge-shaped cross section is formed between said sealing edge (11) and said guide ring (16), and said scraper lip (12) abuts against said one machine part (1 or 5) and is movable relative to and forms with said one machine part an angle (31) of approximately 20 degrees, and said seal ring further includes a resilient shaft seal (2), for sealing said one machine part (1 or 5), located adjacent the seal ring (3) on the oil side.

10. A seal ring (3) according to claim 9, characterized in that a common housing jacket (4) is provided for said seal ring (3) and the shaft seal (2).

* * * * *